(12) United States Patent
Yonezawa et al.

(10) Patent No.: US 6,204,964 B1
(45) Date of Patent: Mar. 20, 2001

(54) LASER MICROSCOPE

(75) Inventors: Yasuo Yonezawa, Zushi; Kenji Ono, Kawasaki; Jiro Mizuno; Atsushi Takeuchi, both of Yokohama, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/452,124

(22) Filed: Dec. 1, 1999

(30) Foreign Application Priority Data

Feb. 17, 1999 (JP) .................................................. 11-038130

(51) Int. Cl.[7] ............................ G02B 21/06; G02B 21/36
(52) U.S. Cl. .......................... 359/385; 359/363; 359/368; 359/370
(58) Field of Search .................................. 359/362–363, 359/368–390, 601, 608–614

(56) References Cited

U.S. PATENT DOCUMENTS 5,633,721 * 5/1997 Mizutani ............................... 356/401

FOREIGN PATENT DOCUMENTS

| 666 054 | * | 1/1995 | (EP) | ..................................... 359/609 |
| 2 305 710 | * | 3/1975 | (FR) | ..................................... 359/363 |
| 3-236699 | * | 10/1991 | (JP) | ..................................... 359/363 |
| 6-133311 | * | 5/1994 | (JP) | ..................................... 359/363 |
| 8-320525 | * | 12/1996 | (JP) | ..................................... 359/601 |

* cited by examiner

*Primary Examiner*—Thong Nguyen
(74) *Attorney, Agent, or Firm*—Oliff & Berridge, PLC

(57) ABSTRACT

Illumination light emanated from a laser illumination light source is reflected by a semi-transparent mirror arranged between first and second objective lenses, and illuminates an object through the first objective lens. Reflected light from the object is incident to the photoelectric conversion device through the first objective lens, the semi-transparent mirror, and the second objective lens, and forms an image of the object. The image is captured by a image-taking plane of the photoelectric conversion device tilted relative to the image plane. The second objective lens is telecentric at the image side. The image-taking plane of the photoelectric conversion device is tilted relative to the image plane. Therefore, almost all diffracted light rays from on-axis and off-axis portion of the image-taking plane among all incident light to the image-taking plane are reflected not to enter the second objective lens.

4 Claims, 13 Drawing Sheets

FIRST ORDER DIFFRACTED LIGHT

LASER MICROSCOPE

INCORPORATION BY REFERENCE

The disclosure of the following priority application is incorporated herein by reference: Japanese Patent Application No. 11-38130 filed Feb. 17, 1999.

BACKGROUND OF THE INVENTION

1. Field of the Invention

The present invention relates to a microscope, and more particularly to a laser microscope using a TV monitor for observing images.

2. Description of the Related Art

FIG. 1 is a schematic view showing construction of a conventional microscope. In the conventional microscope, illumination light emanated from a white light source 1 such as halogen lamp is reflected by a semi-transparent mirror 2 and illuminates an object 4 through an objective lens 3. An image of the illuminated object is formed on an image plane 6 by the objective lens 3 and a second objective lens 5. An image-taking plane of a TV camera is arranged to coincide with the image plane. A light image formed on the image-taking plane is transformed into an electric signal and an observation image is displayed on a TV monitor.

FIG. 2 is a schematic view showing a conceptual diagram of an image-forming optical system of a conventional microscope. As shown in FIG. 2, the image-forming optical system of a conventional microscope is a telecentric system at the object side. However, no telecentric system at the image side is used. In FIG. 2, a reference number 7 denotes an aperture diaphragm.

If the light source is replaced with a laser source in the conventional microscope, a laser microscope can be constructed. However, when reflectance of the object is high, an interference pattern shown in FIG. 3 may be produced on the TV monitor.

SUMMARY OF THE INVENTION

An object of the present invention is to provide a laser microscope free from producing interference pattern on the image to be observed.

A laser microscope according to the present invention comprises; a laser illumination light source, an image-forming optical system which is substantially telecentric at at least image side, leading illumination light emanated from said laser illumination light source to an object and forming an image of reflected light from said object on an image plane, and a photoelectric conversion device having an image-taking plane which receives reflected light forming the image on the image plane, and which converts the light into electric signal. The image-taking plane of the photoelectric conversion device is tilted relative to the image plane in order to avoid interference of rays incident on the image-taking plane. Therefore, aforementioned object is hereby attained. In other words, since no interference of rays takes place on the image-taking plane of the photoelectric conversion device even if reflectance of the object is high, no interference pattern is produced on the image to be observed on the display monitor.

The tilt angle between the image-taking plane of the photoelectric conversion device and the image plane can be determined to satisfy the condition set out below:

$$\sin^{-1}(NA) < \theta < (\tfrac{1}{2}) \cdot \sin^{-1}(\lambda/P) - \sin^{-1}(NA)$$

where, $\theta$: a tilt angle of the image-taking plane of the photoelectric conversion device relative to the image plane;

NA: a numerical aperture at the image side of the image-forming optical system;

$\lambda$: a wavelength of the illumination light to be used; and

P: a period of a periodical structure of the photoelectric conversion device

The image-forming optical system includes a first objective lens located at the object side and a second objective lens located at the image side. The second objective lens can be substantially telecentric at the image side.

A semi-transparent mirror is arranged between the first and second objective lenses. Light emanated from a laser illumination light source is led to illuminate an object through the semi-transparent mirror. Reflected light from the object is incident to the photoelectric conversion device through the first objective lens, the semi-transparent mirror, and the second objective lens. In this case, an aperture diaphragm is arranged between the semi-transparent mirror and the first objective lens, and NA mentioned in the above condition is a numerical aperture of the aperture diaphragm. An imaging device such as CCD can be used as the photoelectric conversion device. P mentioned in the above condition is a pixel pitch of the imaging device such as CCD.

BRIEF DESCRIPTION OF THE DARWINGS

Figure 2:
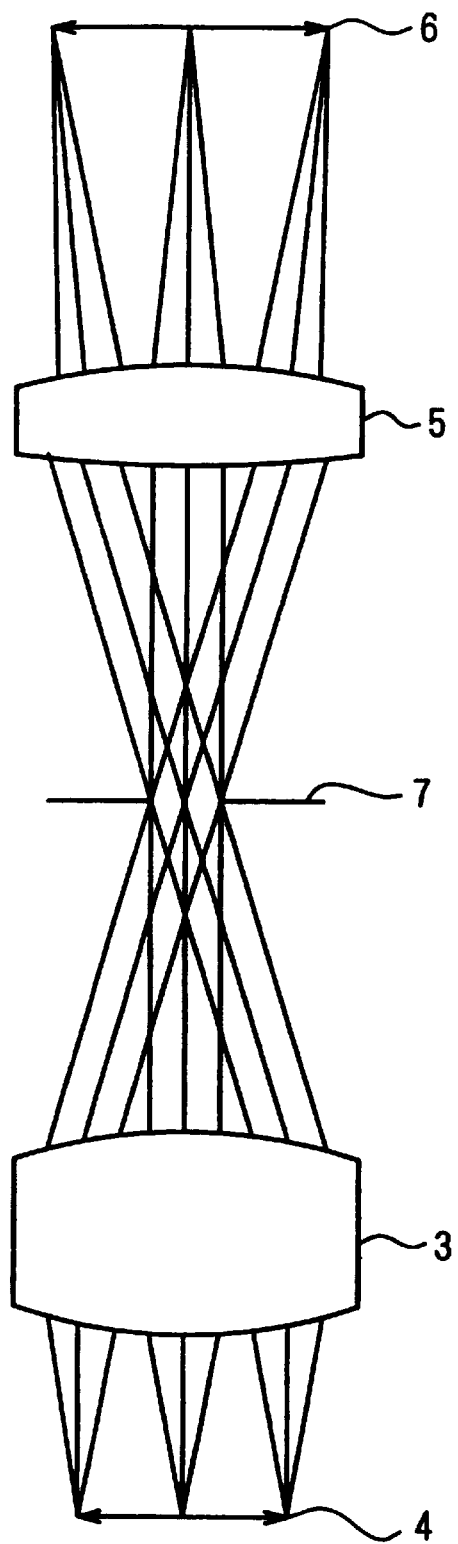
FIG. 2 is a schematic view showing a conceptual diagram of an image-forming optical system of a conventional microscope.
Figure 3:
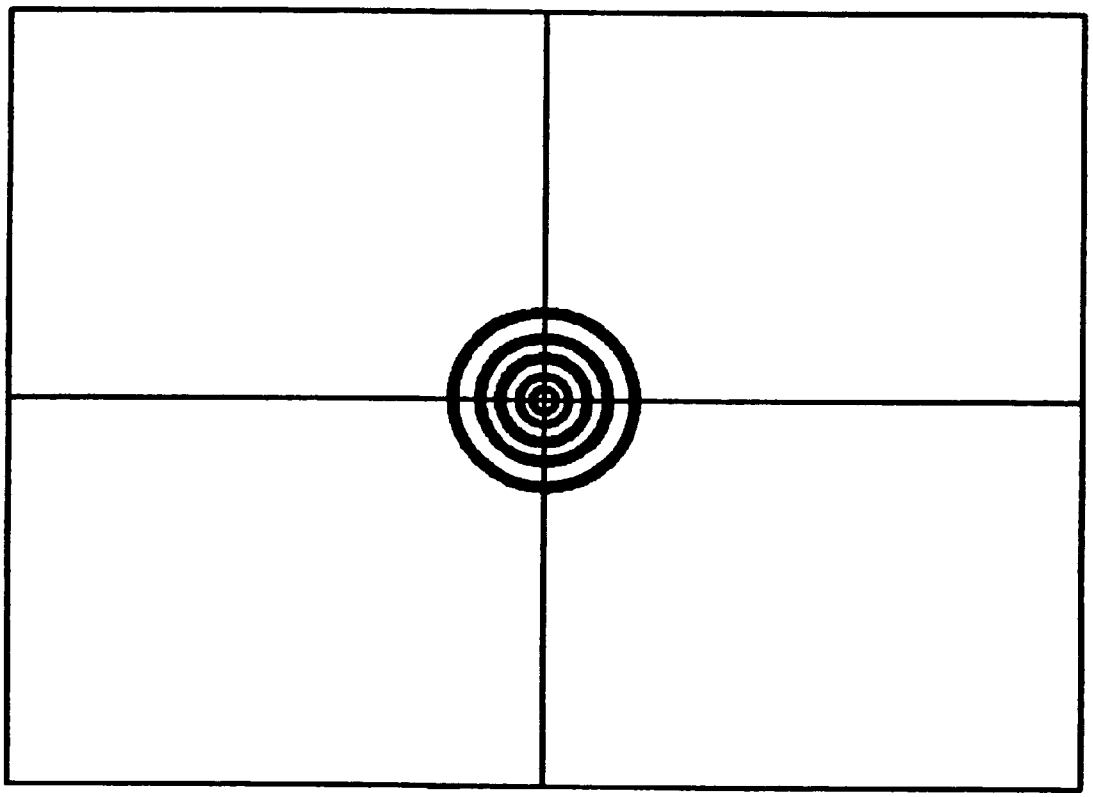
Figure 4:
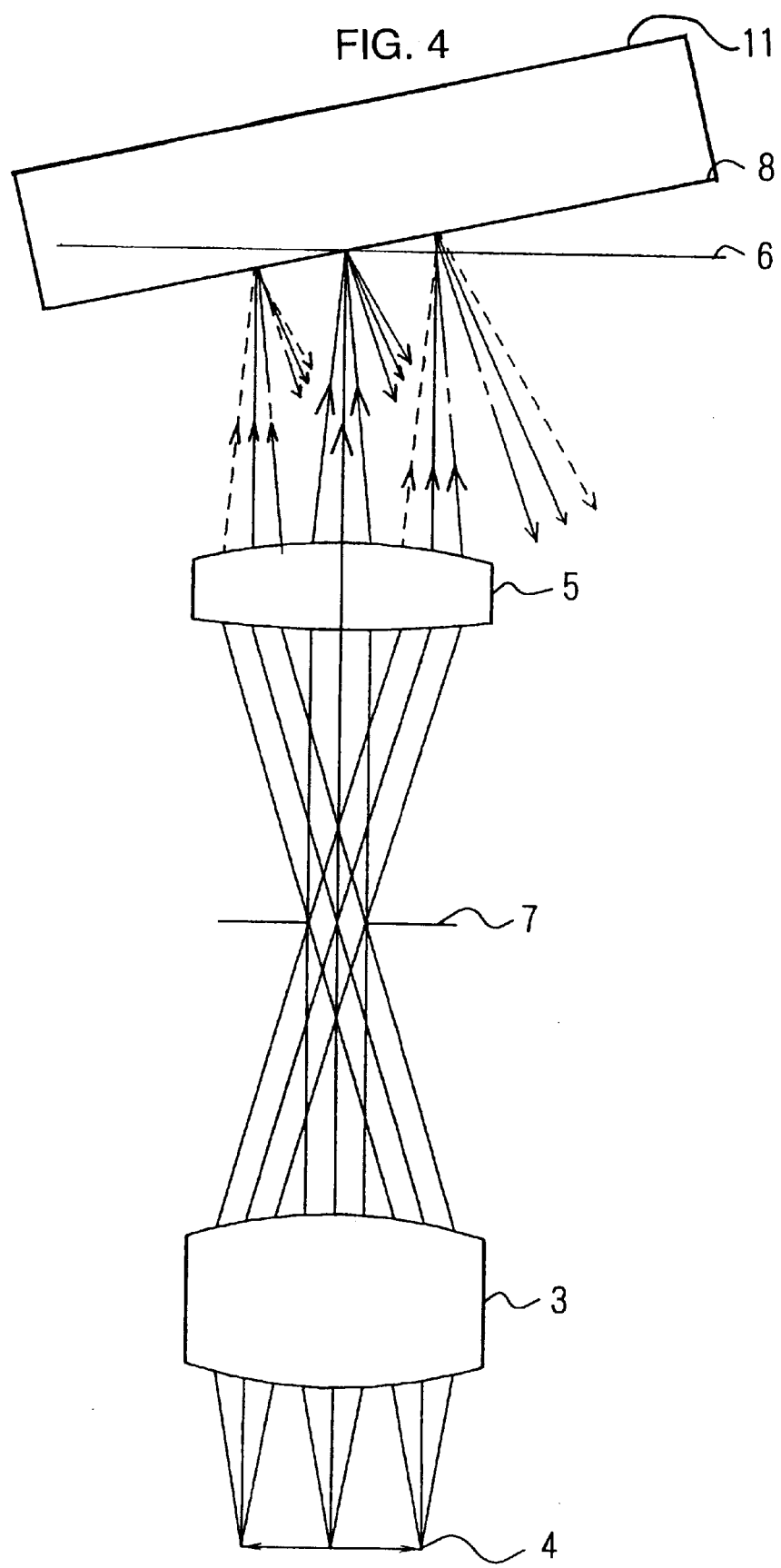
Figure 5:
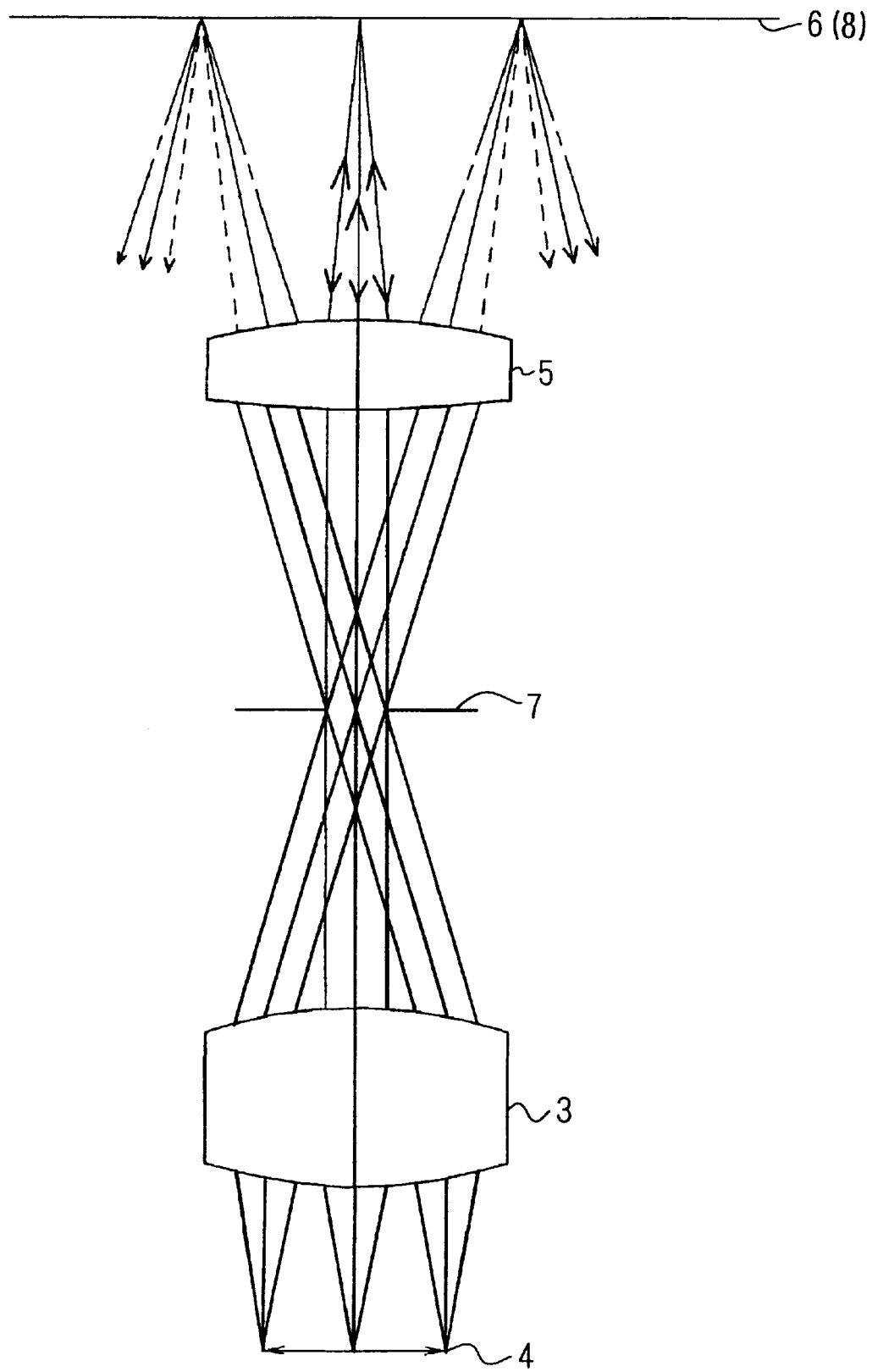
Figure 6:
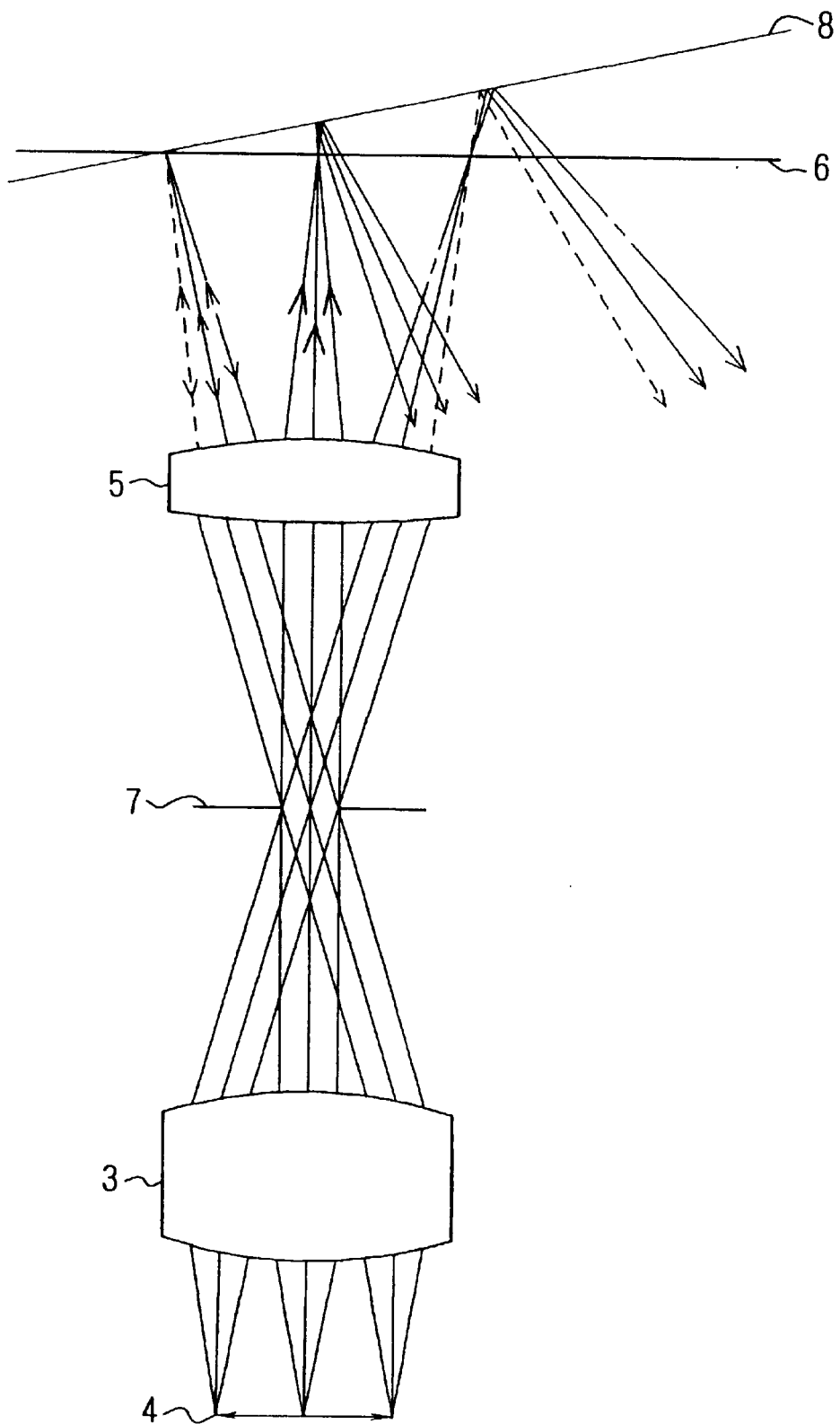
Figure 7:
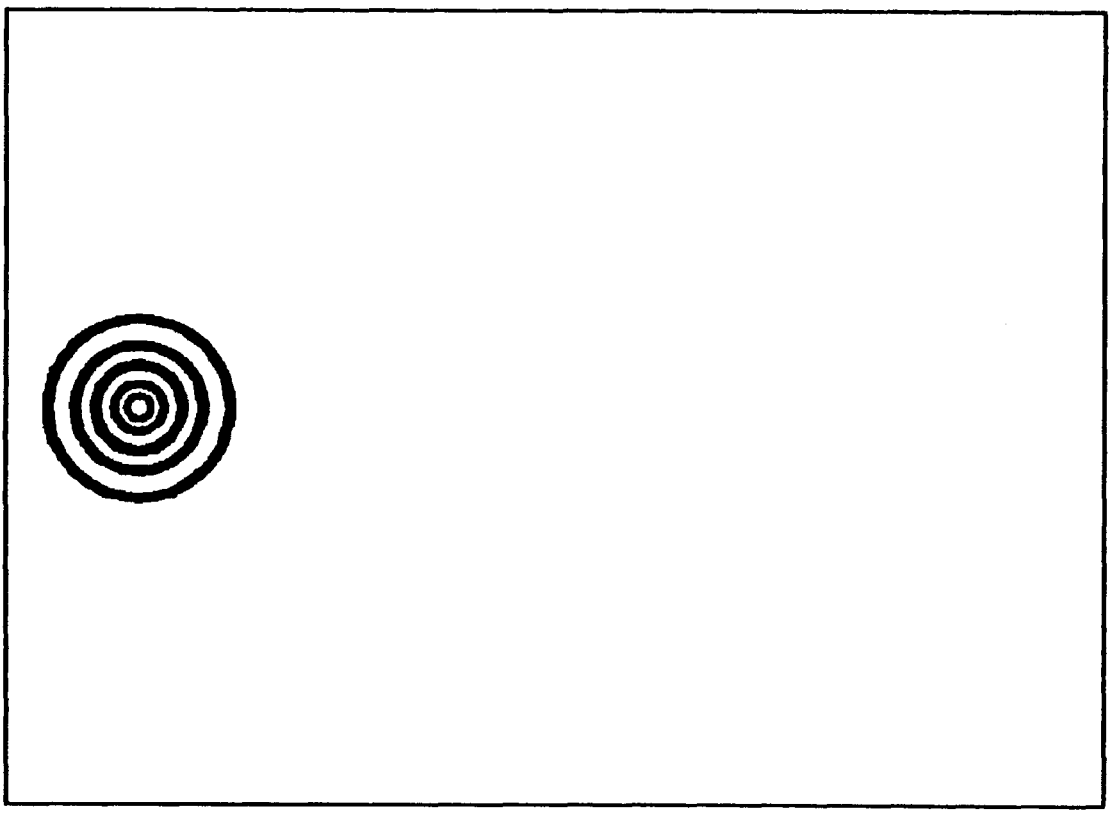
Figure 8:
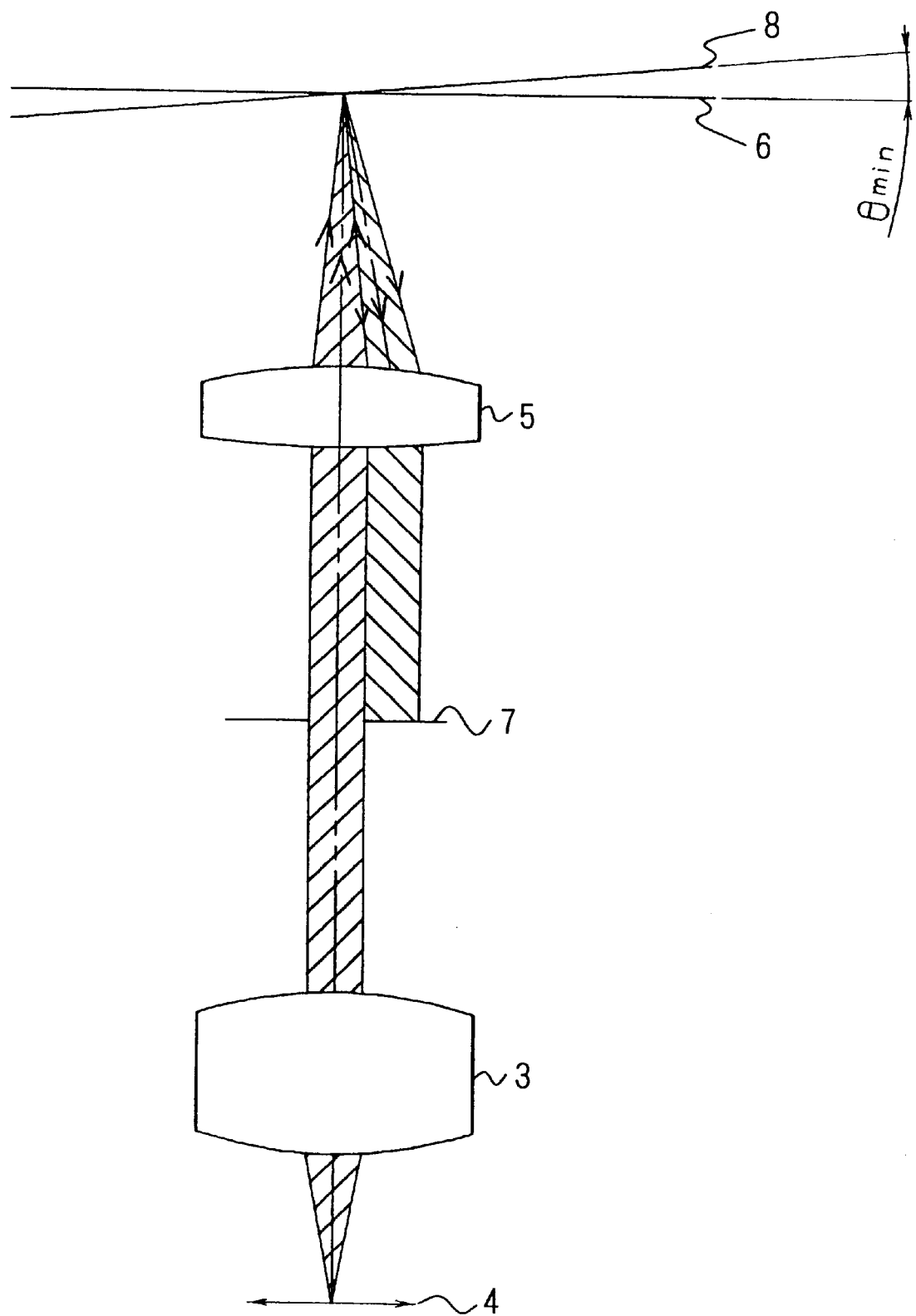
Figure 9:
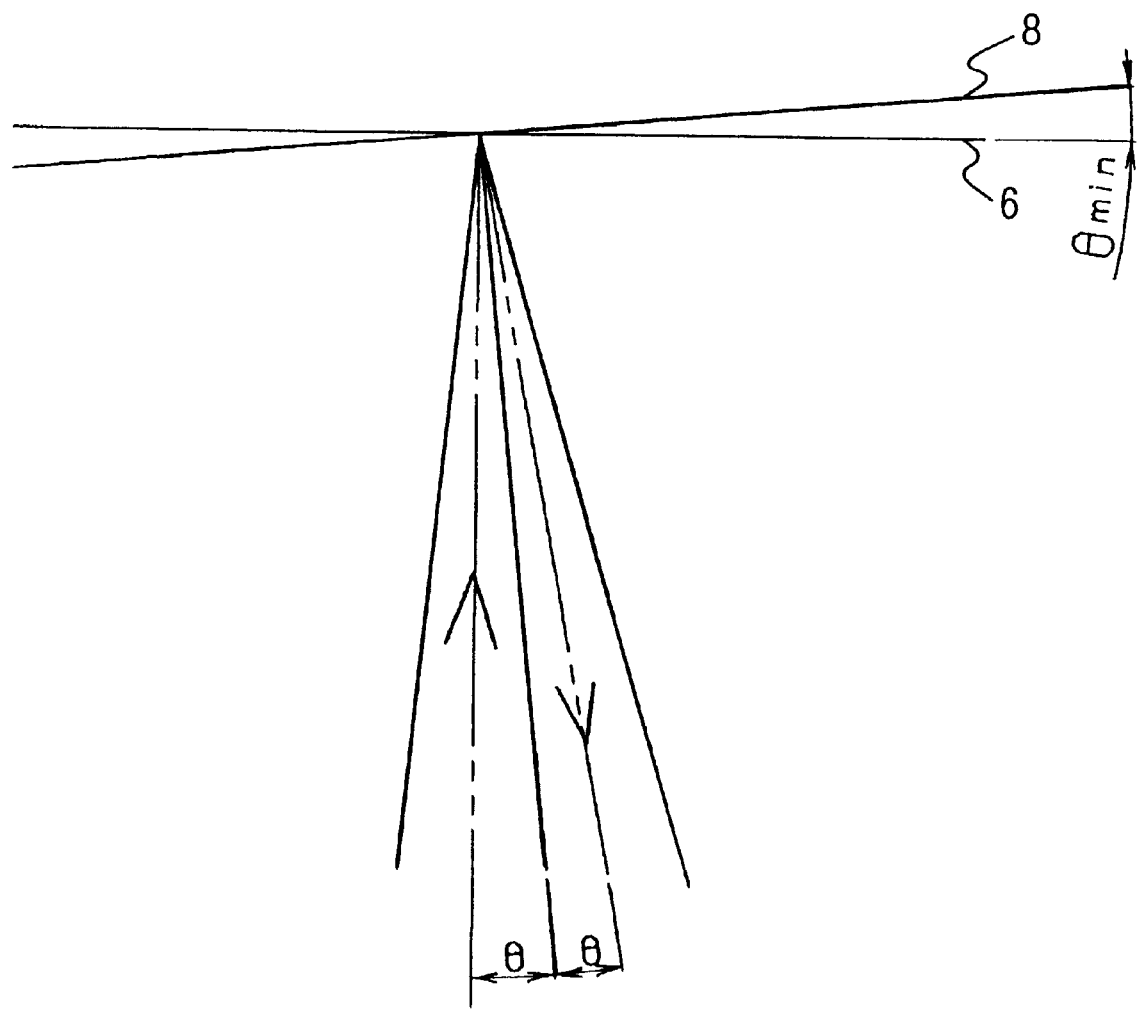
Figure 10:
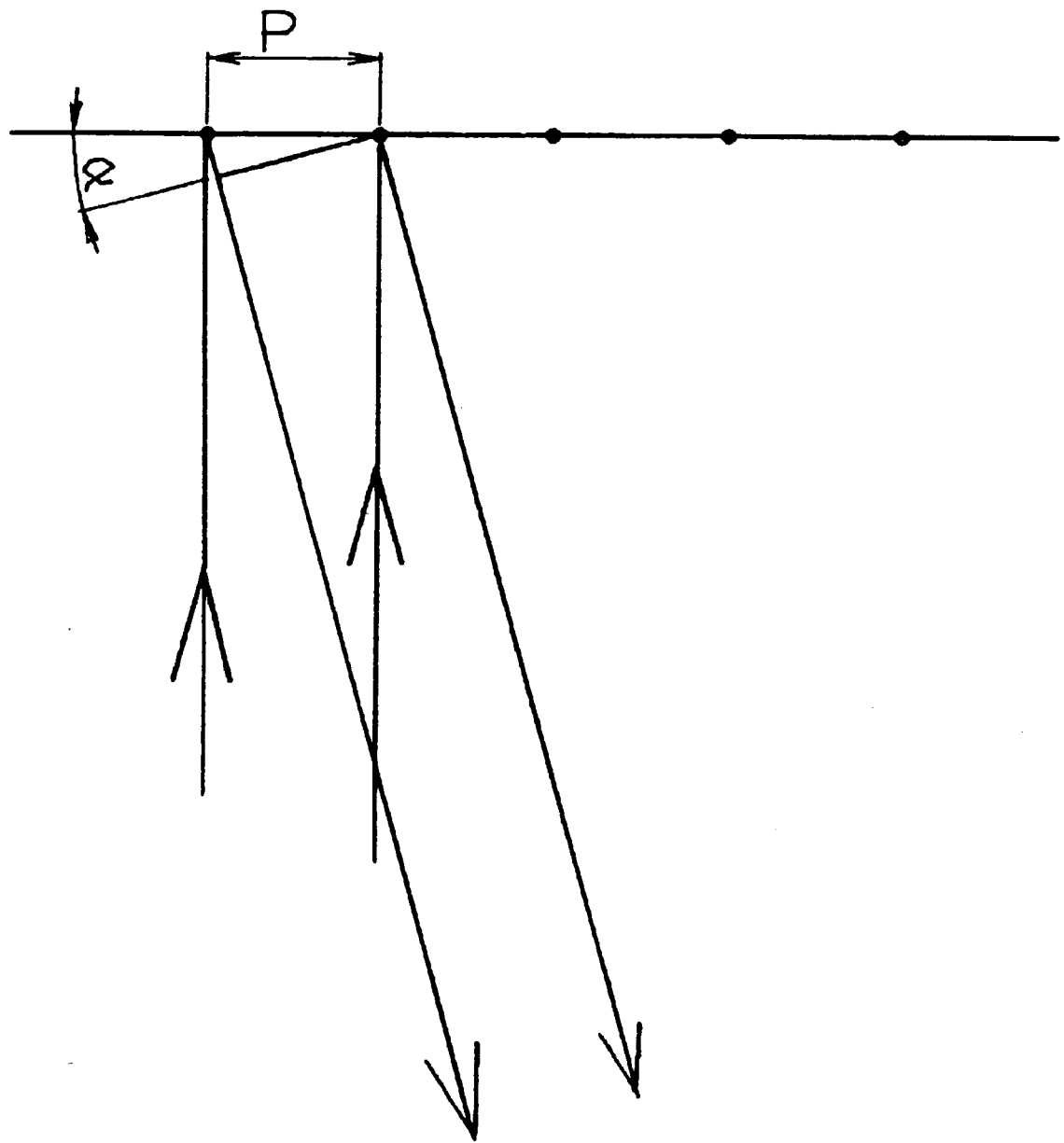
Figure 11:
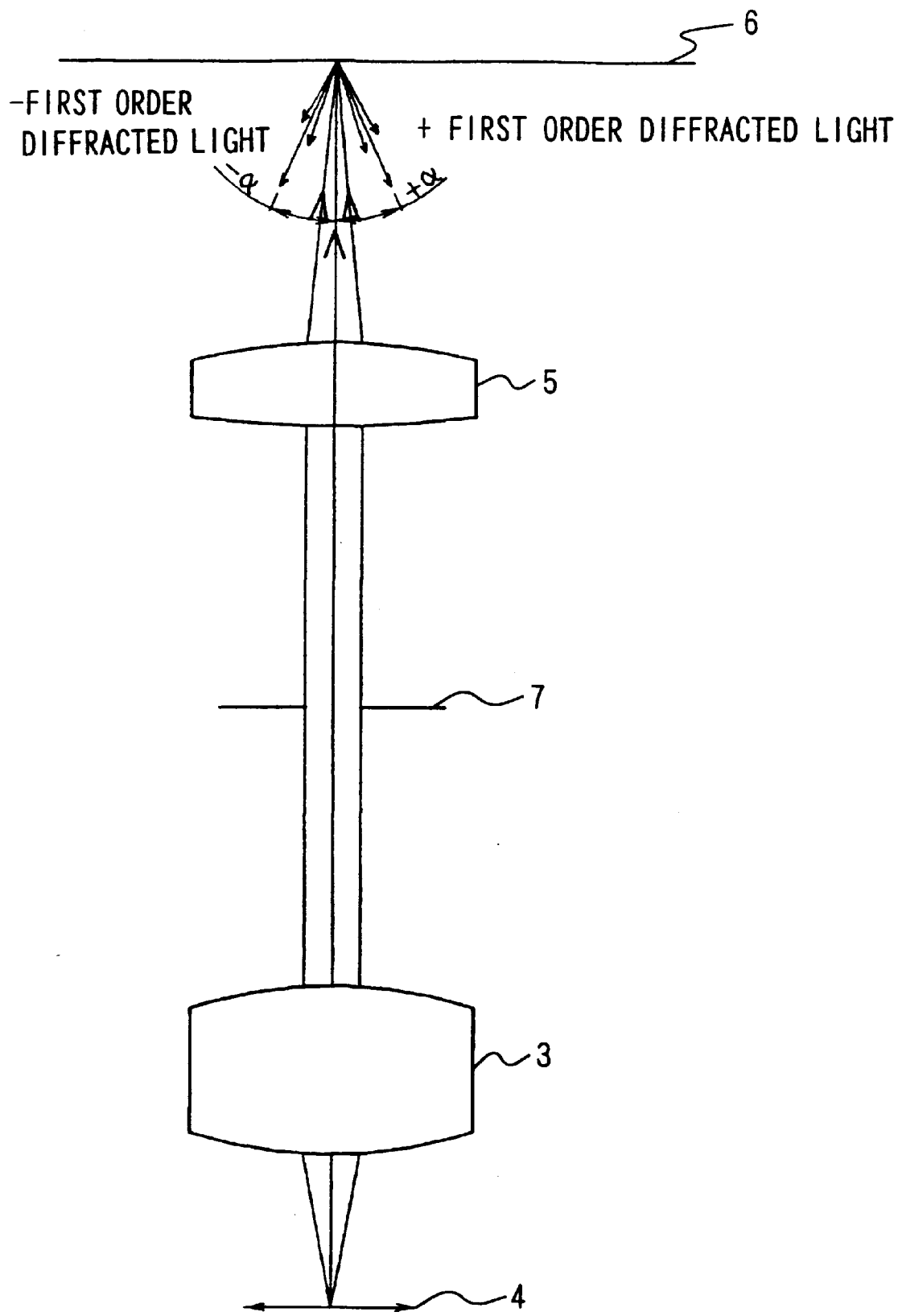
Figure 12:
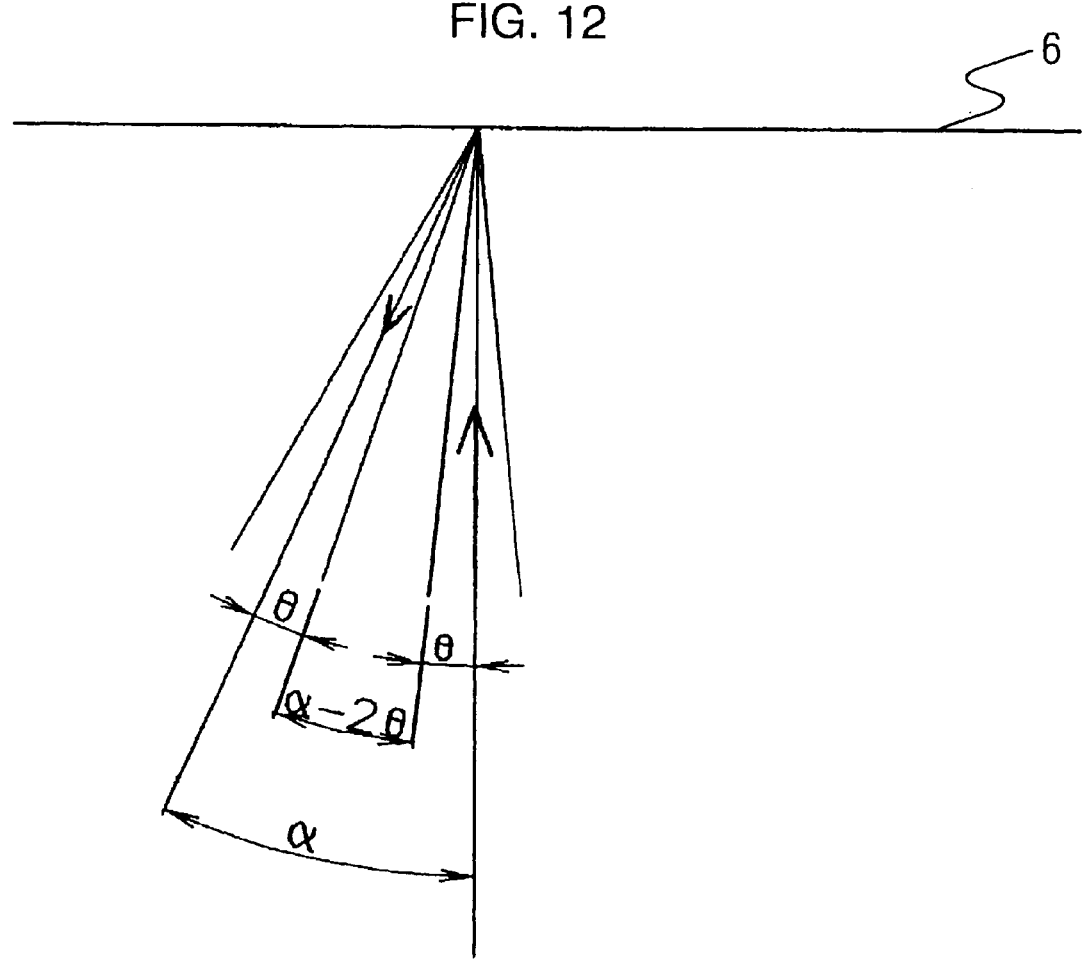
Figure 13:
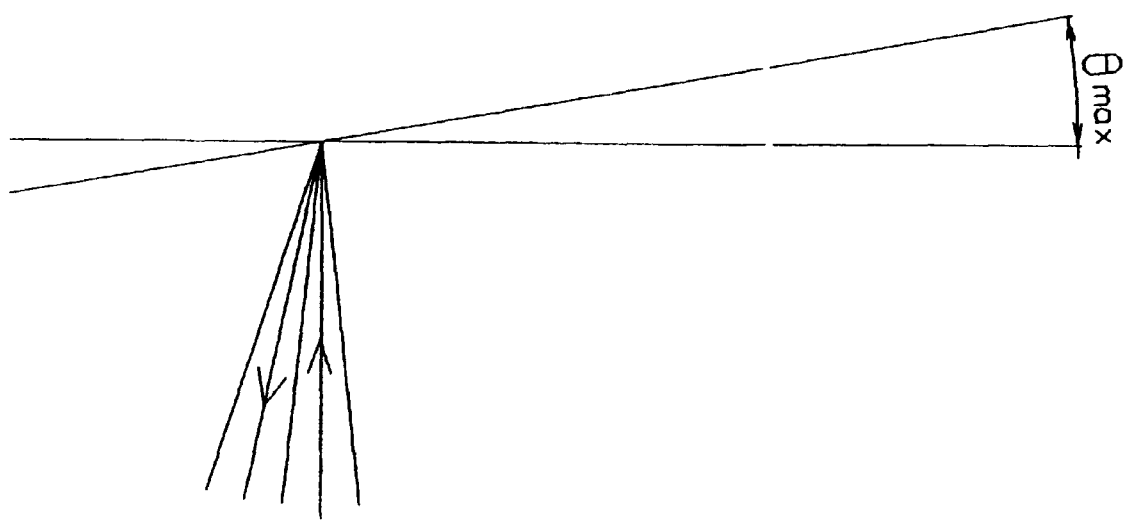
Figure 14:
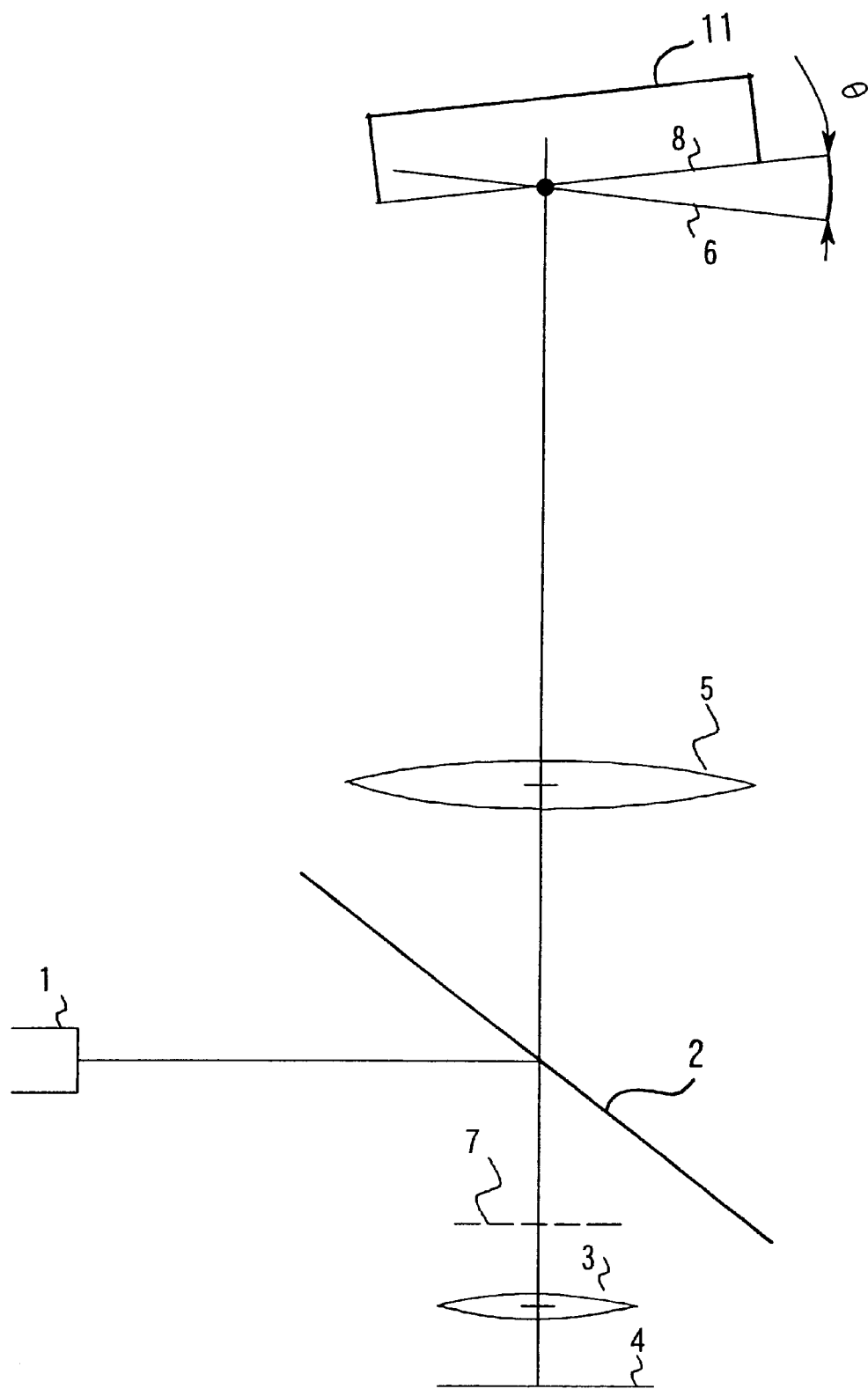

FIG. 3 schematically shows a typical interference pattern produced in the image-forming optical system in FIG. 2;

FIG. 4 is a schematic view showing an image-forming optical system according to an embodiment which is telecentric at the image side with the image-taking plane tilted relative to the image plane;

FIG. 5 is a schematic view showing an image-forming optical system which is not telecentric at the image side without tilting the image-taking plane relative to the image plane;

FIG. 6 is a schematic view showing the image-forming optical system with the image-taking plane tilted relative to the image plane in FIG. 5;

FIG. 7 schematically shows a typical interference pattern produced in the image-forming optical system in FIG. 6;

FIG. 8 shows relation between a tilt angle of the image-taking plane and light reflected from the image-taking plane;

FIG. 9 shows the vicinity of the image plane of FIG. 8 in enlarged manner;

FIG. 10 shows a periodical structure of an imaging device;

FIG. 11 is a schematic view showing an image-forming optical system using the imaging device shown in FIG. 10;

FIG. 12 shows the vicinity of the image plane of FIG. 11 in enlarged manner;

FIG. 13 shows the vicinity of the image plane with the image-taking plane tilted by the amount of $\theta$max in enlarged manner; and FIG. 14 is a schematic view showing a laser microscope of an embodiment according to the present invention.

DESCRIPTION OF THE PREFFERED EMBODIMENT

Figure 1:
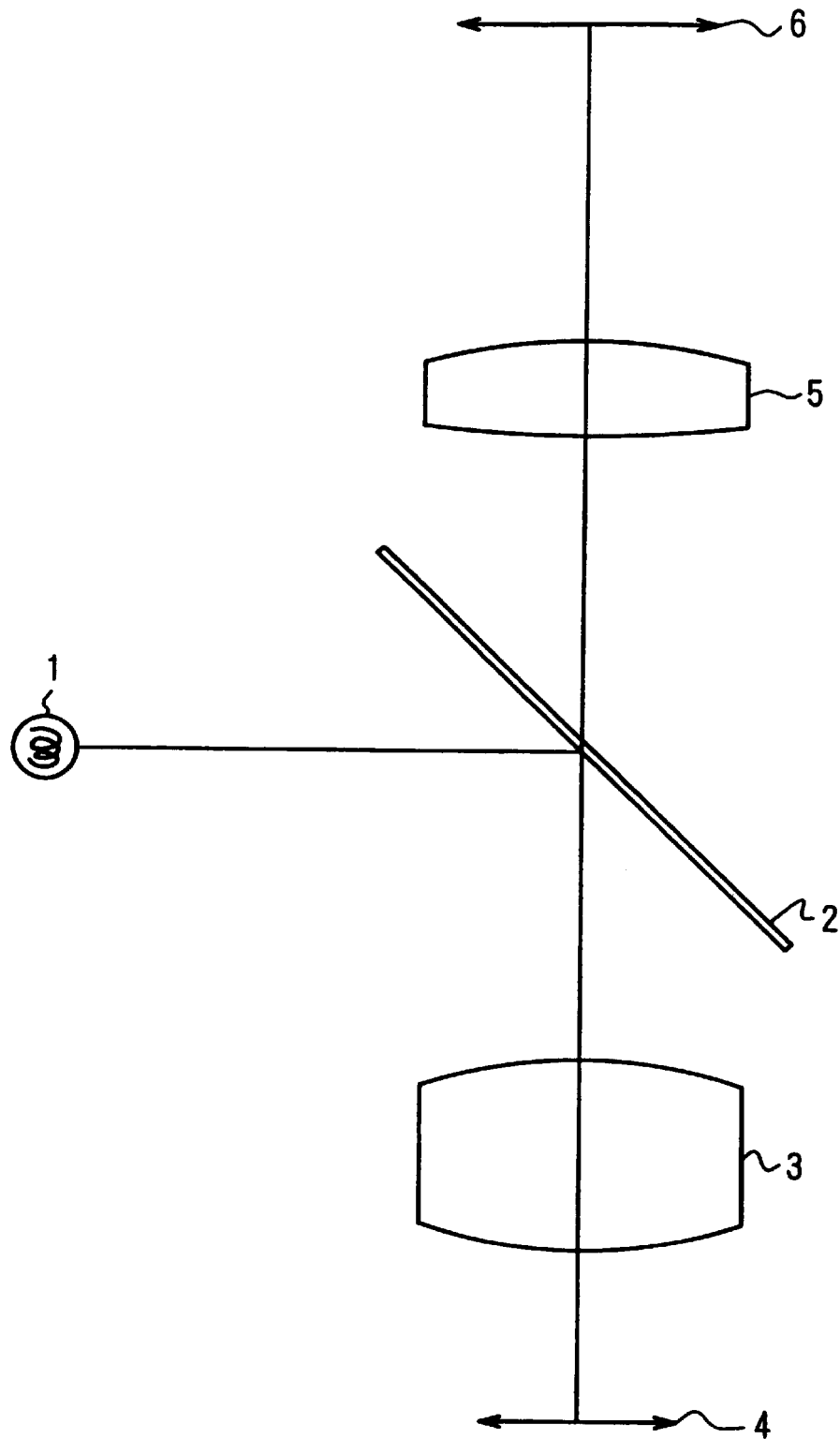
FIG. 1 is a schematic view showing construction of a conventional microscope.

FIG. 4 is a schematic view showing a typical image-forming optical system of a laser microscope of an embodiment according to the present invention. The same reference symbol in FIG. 1 or 2 is applied to a similar portion in FIG. 4, and different portion will be described. The image-forming optical system of the laser microscope according to the embodiment comprises a first objective lens 3 and a second objective lens 5 and is formed to be telecentric at both the object and image sides. The image-taking plane 8 as a detector plane of a photoelectric conversion device 11 such as imaging device is tilted relative to the image plane 6.

If the image-forming optical system is designed as a telecentric system at both the object and image sides as shown in FIG. 4, tilts of principal rays in the rays on the central portion or the optical axis and on the peripheral portions or the off-axis, become the same, that is, become parallel. As a result, if the image-taking plane 8 is tilted, all the light rays reflected on the image-forming plane 8 go outside the image-forming optical system, so that production of an interference pattern on the image to be observed can be prevented. It is not necessary for image side rays to be strictly telecentric at all angles of view. A substantially telecentric system may be acceptable as long as no interference pattern is produced.

On the other hand, FIG. 5 shows optical paths in the image-forming optical system in which image side rays are not telecentric as the conventional microscope. In FIG. 5, if the image-taking plane 8 coincides with the image plane 6, since the image-forming optical system is not telecentric at the image side, interference takes place on the image-taking plane and interference pattern can be observed on the TV monitor as shown in FIG. 3. This phenomenon is caused by interference between the light rays which return to the image-taking plane 8 after reflected light from the image-taking plane 8 has been passing through the image-forming optical system and reflected from the object and the light rays which come from the object and arrive at the image-taking plane 8.

If the image-taking plane 8 is tilted relative to the image plane 6 as shown in FIG. 6, reflected light on the central portion or the optical axis goes outside the light rays contributing image forming. However, reflected light on the peripheral portion or the off-axis interferes with light from the object to produce an interference pattern. This phenomenon is caused by the fact that the image-forming optical system is not telecentric at the image side and, therefore, the tilts of the principal rays on the central portion and on the peripheral portion are different. FIG. 7 shows a display example of an interference pattern in the image to be observed on the TV monitor according to the image-forming optical system in FIG. 6.

Then, in the case of aforementioned embodiment, an interference pattern may be produced depending on the tilt angle between the image plane 6 and the image-taking plane 8 even if the image-forming optical system is telecentric at the image side. Following consideration will be made with respect to what kind of condition of the tilt angle between the image plane 6 and the image-taking plane 8 is required in order to avoid producing an interference pattern.

Here, when the tilt angle between the image plane and the image-taking plane is θ, the condition that reflected light from the image-taking plane does not come back to the image-taking plane is that reflected light cannot pass through the aperture diaphragm 7. When this condition is fulfilled at the minimum angle of θ, as shown in FIG. 8, the incident light rays and the reflected light rays are just contact and not overlapping with each other. FIG. 9 shows the enlarged vicinity of the image plane in this this state.

Accordingly, the possible minimum angle θmin is as follows:

$$\sin^{-1}(NA) = \theta\min \tag{1}$$

where,

NA: a numerical aperture at the image side of the image-forming optical system.

Further explanation will be made with respect to the larger tilt angle θ.

A CCD generally used for image-taking device has periodic structure on the image-taking plane. When light is incident on the image-taking plane of a CCD as shown in FIG. 10, reflected light is diffracted. FIG. 11 is a schematic view showing the relation between an image-forming optical system, whose image-taking plane is not tilted relative to the image plane, and ±first-order diffracted light. In this case, the following equation is satisfied:

$$P \cdot \sin \alpha = \lambda \tag{2}$$

where α denotes a diffraction angle of first order diffracted light, P denotes a pitch of the periodic structure of CCD, and λ denotes an wavelength of light using for observation.

In such a case, when the image-taking plane is tilted at a certain larger tilt angle relative to the image plane, the first-order diffracted light produced on the image-taking plane starts to pass through the aperture diaphragm. Then passing light reaches the object and reflects back again to the image-taking plane, so that an interference pattern is produced on the image-taking plane. The certain larger tilt angle θ of the image-taking plane relative to the image plane will be discussed below.

FIG. 12 shows the enlarged vicinity of the image plane of FIG. 11. It will be understood from FIG. 12 that when the image-taking plane is tilted relative to the image plane, there is an angle α−2θ to spare until the first-order diffracted light starts to pass through the aperture diaphragm. Therefore, the possible maximum value θmax is as a following equation:

$$\theta\max = (\alpha - 2\theta)/2.$$

From the equation (2), $\alpha = \sin^{-1}(\lambda/P)$ and $\theta = \sin^{-1}(NA)$, the following equation is derived;

$$\theta\max = (\frac{1}{2}) \cdot \sin^{-1}(\lambda/P) - \sin^{-1}(NA) \tag{3}$$

Accordingly, in the present invention to securely avoid producing an interference pattern on the image-taking plane, it is desirable to satisfy the following conditional formula derived from the equations (1) and (3):

$$\sin^{-1}(NA) < \theta < (\frac{1}{2}) \cdot \sin^{-1}(\lambda/P) - \sin^{-1}(NA)$$

where,

θ: a tilt angle between the image plane and the image-taking plane

NA: a numerical aperture at the image side of the image-forming optical system

λ: a wavelength of light using for observation

P: a period of the periodic structure of the image-taking device (i.e., image pixel pitch)

EXAMPLE

An example of the present invention is shown in FIG. 14. An illumination light source 1 is a laser having a wavelength of 266 nm. Focal length of the first objective lens 3 is 2 mm. Focal length of the second objective lens 5 is 200 mm. A Numerical aperture at the object side is 0.9. Magnification is 100. The space D0 between the object plane 4 and the principal plane of the first objective lens 3 is 2 mm. The space D1 between the principal plane of the first objective lens 3 and the aperture diaphragm 7 is 2 mm. The space D3 between the aperture diaphragm 7 and the principal plane of the second objective lens 5 is 200 mm. The space D4 along the optical axis between the principal plane of the second objective lens 5 and the image-taking plane 8 is 200 mm. The image-forming optical system is telecentric at the image side. As for the image-taking device 11, a CCD with 5 μm image pixel pitch is used. Output signal is sent to TV monitor (not shown), and an image of the object is displayed. The tilt angle θ of the image-taking device 11 can be arbitrarily chosen within the range; $0.52° < \theta < 1°$.

What is claimed is:

1. A laser microscope comprising:

a laser illumination light source;

an image-forming optical system which is substantially telecentric at at least an image side, leads illumination light emanated from said laser illumination light source to an object, and forms an image of reflected light from said object on an image plane; and a photoelectric conversion device having an image-taking plane which receives reflected light forming the image on the image plane, and converts the light into an electric signal; wherein, the image-taking plane of the photoelectric conversion device is tilted relative to the image plane in order that no interference of rays incident on the image-taking plane takes place, and wherein the following condition is fulfilled:

$$\sin^{-1}(NA) < \theta < (\tfrac{1}{2})\cdot\sin^{-1}(\lambda/P) - \sin^{-1}(NA)$$

where,

θ: a tilt angle of the image-taking plane of the photoelectric conversion device relative to the image plane, NA: a numerical aperture of the image side of the image-forming optical system, λ: a wavelength of the illumination light to be used, and P: a period of a periodical structure of the photoelectric conversion device.

2. A laser microscope according to claim 1; wherein, said image-forming optical system includes a first objective lens located at an object side thereof and a second objective lens located at the image side, and said second objective lens is substantially telecentric at the image side.

3. A laser microscope according to claim 2; further comprising a semi-transparent mirror arranged between said first and second objective lenses; wherein, reflected light from said object is incident to said photoelectric conversion device through said first objective lens, said semi-transparent mirror, and said second objective lens, after light emanated from said laser illumination light source illuminates the object through said semi-transparent mirror.

4. A laser microscope according to claim 3; further comprising an aperture diaphragm arranged between said semi-transparent mirror and said first objective lens.

* * * * *